UNITED STATES PATENT OFFICE.

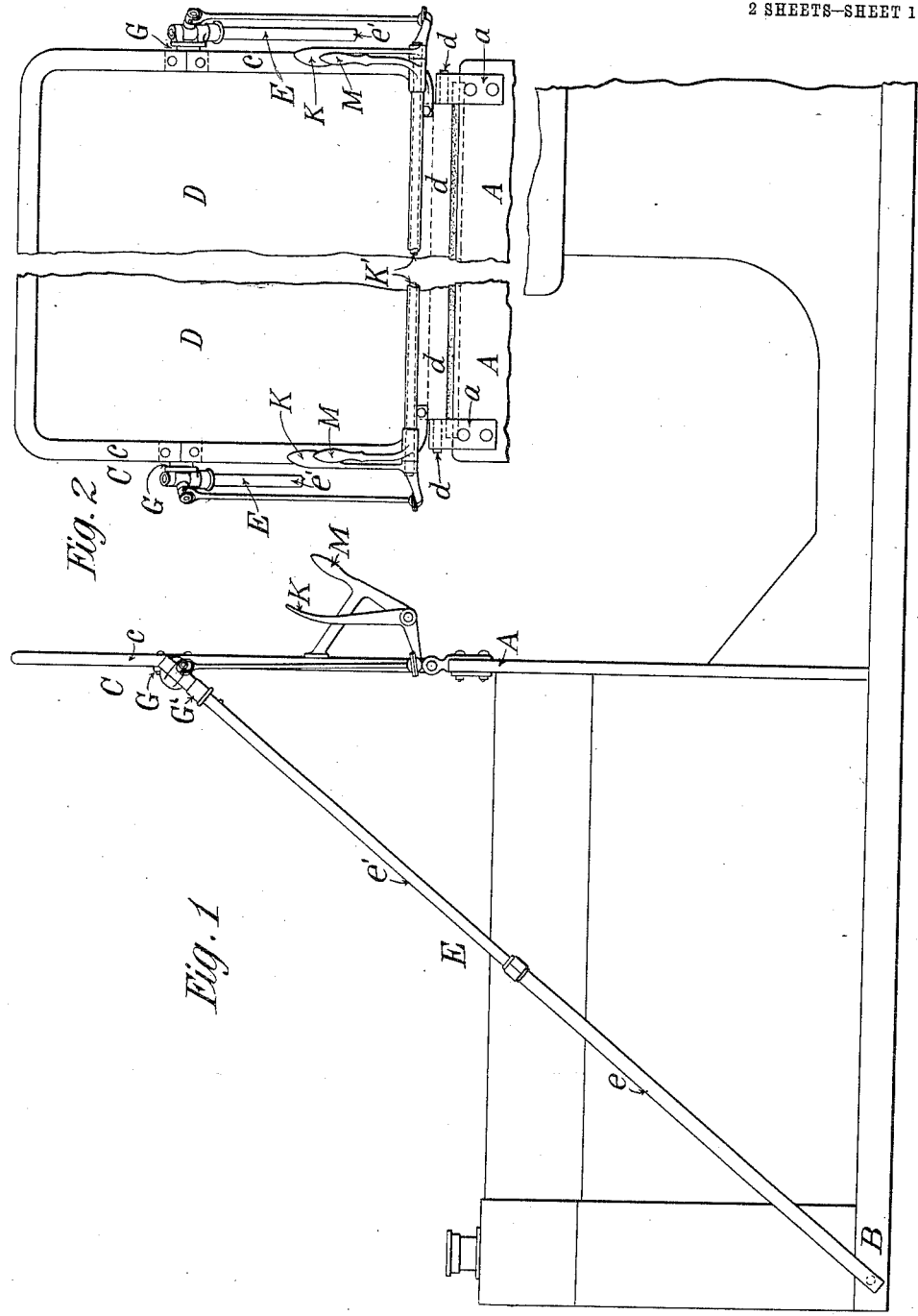

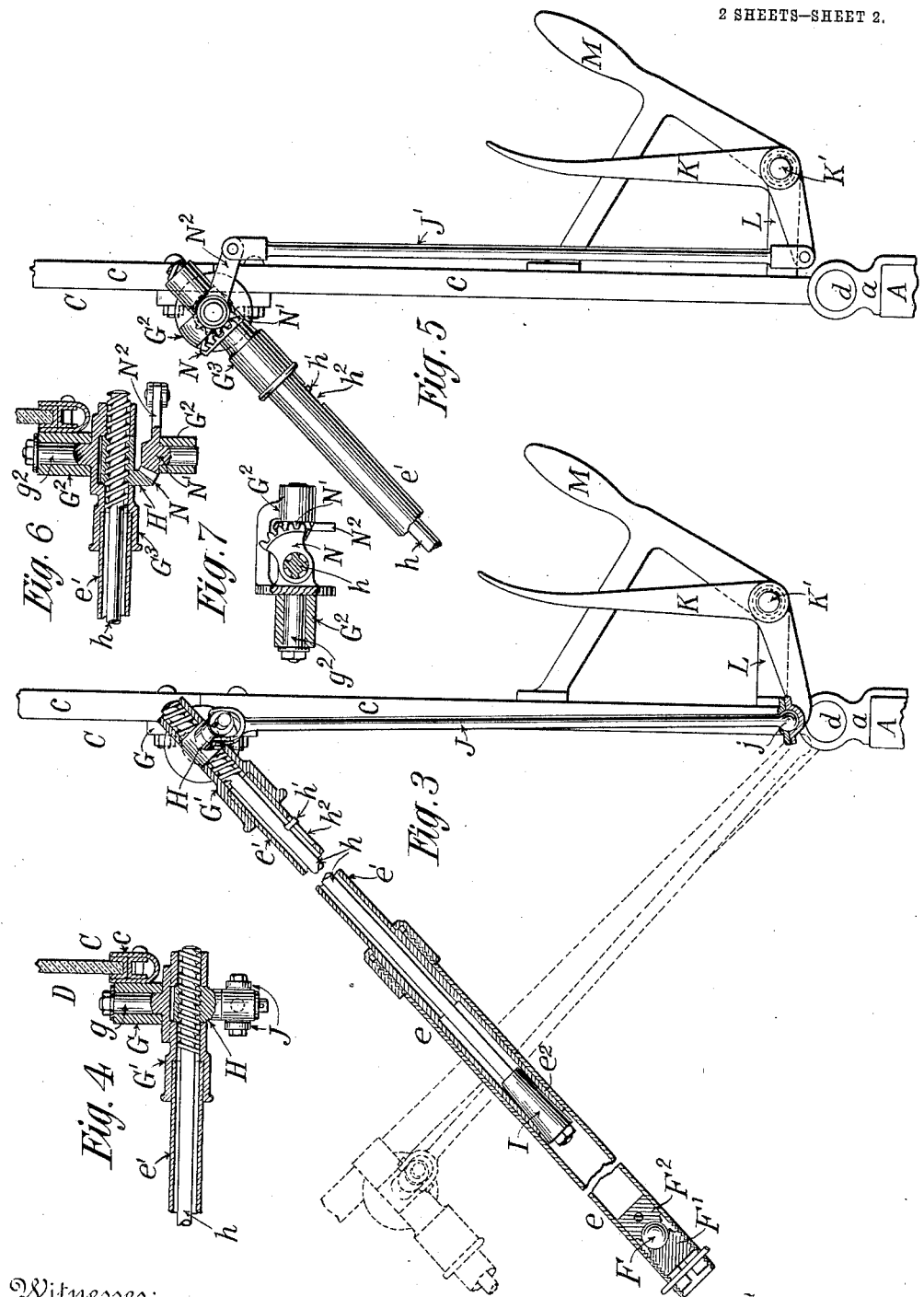

RAPHAËL NETTER, OF NEW YORK, N. Y., ASSIGNOR TO OLIVER M. EDWARDS, OF SYRACUSE, NEW YORK.

WIND-SHIELD FOR VEHICLES.

1,097,459.

Specification of Letters Patent.

Patented May 19, 1914.

Application filed March 19, 1909. Serial No. 484,352.

*To all whom it may concern:*

Be it known that I, RAPHAËL NETTER, a citizen of France, residing in the city of New York, borough of Manhattan, county and State of New York, have invented certain new and useful Improvements in Wind-Shields for Vehicles, of which the following is a full, clear, and exact description, reference being had to the drawings, accompanying and forming a part of the same.

My invention relates generally to what are commonly known as "wind shields", which are more or less transparent and are arranged in front of the operator's or driver's seat of automobiles or other vehicles to more or less protect those riding therein from the effects of quickly passing through the air, against the wind or in storms and it relates more particularly to that class of wind shields having a movable portion or portions adapted to be moved more or less out of the protecting position that such shields usually occupy in use.

The object of my invention is to provide simple, cheap and desirable means for securing the movable portion or portions of the shield in the desired positions and releasing the same for moving such portion or portions out of one desired position to another.

The invention consists in the combination of parts or devices hereinafter set forth and particularly pointed out in the claims hereunto annexed and forming a part of this specification.

Like letters of reference wherever they occur indicate corresponding parts in the several figures of the drawings.

Figure 1 illustrates in side elevation a portion of the body of an automobile having one embodiment of my invention combined therewith, the wind shield being shown in the protecting position; Fig. 2 shows the wind shield seen in Fig. 1 in rear elevation or as seen when one is seated in the automobile, such shield being partly broken away as shown; Fig. 3 illustrates partly in section and partly in side elevation the construction seen in Figs. 1 and 2, portions being broken away in order to show the parts on an enlarged scale from what they are seen in Fig. 1; Fig. 4 illustrates in section portions of the connection between the bracing or holding means and the movable portion of the wind shield seen in Fig. 3; Fig. 5 shows a modified form of connection between the operating handles and the clamping or locking and releasing means, the parts being shown in side elevation. Fig. 6 shows in section the connection of this modified means with the movable portion of the wind shield seen in Fig. 5; and Fig. 7 shows partly in elevation and partly in section portions of this same connection with the movable portion of the wind shield.

In Figs. 1 to 4, inclusive, A represents that portion of the automobile, car or carriage to which the wind shield therein shown is attached and B represents that portion to which the means for bracing or holding the movable portion of the shield in position is attached.

C represents the movable portion of the shield, $c$ the frame thereof which holds the glass D. Any desirable means may be employed for hinging or connecting the movable part of the wind shield to the immovable part thereof or to the car or vehicle. As here shown the movable portion of the wind shield is connected to the car or vehicle by means of a pivotal connection formed of two members, one of which $a$ is attached to the immovable portion A of the car and the other member $d$ is attached to the lower portion of the frame $c$ of the movable portion of the shield, as is more particularly seen in Figs. 2 and 3 of the drawings.

In a wind shield of the form herein described it is desirable that the movable portion thereof be positively held in the desired position by means adapted to brace and hold such part against displacement. As herein shown I have illustrated bracing or holding means formed in two parts, one part preferably moving telescopically in the other part in an endwise direction, there being preferably two of such bracing or holding means, one arranged at one side of the car or carriage and the other at the opposite side thereof. Any desired form of bracing or holding means may be employed so long as such means are adapted to hold or brace the movable part of the shield in the desired position and be released to permit such portion to be moved from one desired position to another. The bracing or holding means as here shown are designated as E and are composed of two sections, $e$ and $e'$, the section $e'$ being telescopically movable interiorly of the other section $e$, as is more particularly seen in Fig. 3 of the drawings.

The telescopic section $e$ at each side of the vehicle is preferably connected therewith by a form of universal joint, composed, as shown, of a rounded head F working in semicircular recesses in blocks $F'$, $F^2$, secured in the lower part of such section. The head F is attached to the part B of the car or carriage so that the telescopic section $e$ may have a movement relatively to the car or carriage in different directions, there being one of these universal joint connections for each bracing or holding means at each opposite side of the car. The telescopic sections $e'$ are preferably pivotally connected to the movable portion of the shield by brackets G attached to the frame $c$ of the shield, each bracket carrying a pivot $g$ movable therein. Each of these pivots $g$ is attached to a head piece $G'$ secured to the upper end of the telescopic section $e'$ so that as the movable portion of the wind shield is moved from one desired position to another the pivots $g$ turn in the brackets G, thus permitting the head pieces $G'$ and the telescopic sections $e'$ to move relatively to the sections $e$ in an endwise direction relatively to the sections $e$ to the extent necessary for the movable portion of the shield to reach the desired position, the pivots $g$ turning in the brackets G as this endwise movement takes place. These head pieces $G'$ carry nuts, each of which is free to partially rotate in its respective head piece, the axial center of the nut being that of the axial center of the telescopic section $e'$. Each of these nuts H is provided with screw threads adapted to receive screw threads formed upon a rod $h$, which is arranged on the interior of each of the telescopic sections $e'$, as is clearly seen in Figs. 3 and 4. Each nut H is so mounted upon the screw threads of its respective rod $h$ that it can take on a partial rotation without movement in an endwise direction relatively to its respective head piece $G'$. Each rod $h$ is prevented from moving in a rotative direction by a pin $h'$ attached thereto and passing through a slot $h^2$ in its respective telescopic section $e'$, as seen in Fig. 3 of the drawings. As a result of the partial rotative movement of each nut H and the nonrotative movement of its respective rod $h$, such rod is given a slight endwise movement accordingly as the nut H is rotated. Each rod $h$ extends downward through the interior of its telescopic section $e'$ and at its lower end receives a conical part I. Each conical part I is fixedly secured to its rod $h$ and is tapered to enter the tapered portion of the lower end of its telescopic section $e'$. The tapered portion $e^2$ of each telescopic section $e'$ is split into different parts so that each is free to have a limited movement toward and away from the interior surface of its respective telescopic section $e$. The conical portion I and the split tapered portions of each of the telescopic sections $e'$ form holding or clamping means by which the two sections of each of such holding or bracing means are locked and held in fixed relation to one another in an endwise direction and are released from their holding or locking engagement with one another. This locking and releasing of the telescopic sections by such clamping or holding means is accomplished by the endwise movement of the conical part I relatively to the tapered split portion $e^2$ of each of the telescopic sections $e'$. The locking of the sections together takes place upon the conical part I being forced into the tapered split portion $e^2$ of each of the sections $e'$ and the releasing or unlocking of such telescopic sections is caused by the movement of the same parts relatively to sections $e'$ in the opposite direction. The movement of the conical parts I is caused to take place by the endwise movement of the rods $h$ to which such conical parts are attached and this movement of the rods $h$ is accomplished by the partial rotation, either in one direction or the other, of the nuts H in the head pieces $G'$ of the telescopic sections $e'$.

The partial rotation of the nuts H is caused to take place by pitman rods J pivotally connected to the nuts and with levers K, the latter connection being by ball and socket joints $j$, as seen in Fig. 3. Each lever K is preferably pivotally attached to a bracket L fixedly secured to the movable portion of the wind shield at a point removed from the nuts H and near the pivotal connection $a$, $d$. The free ends of these levers K form handles by which such levers may be operated to move upon their fulcrums or pivots and cause the pitmen J to give rotative movement to the nuts H. Handles M are preferably fixedly secured to the brackets L so that when such handles are grasped, the movable portion of the shield, being free to move, such portion is moved, through means of the handles, M, from one desired position to another and held in such position until the telescopic sections are locked together by the action of the nuts H on the rods $h$ to brace and hold the parts against movement relatively one to another.

As seen in Fig. 2 of the drawings the telescopic sections $e$ and $e'$, the locking and releasing means and the operating means are duplicates of each other at each side of the car or vehicle and the handles, as K, are connected together being both fixedly attached to a shaft $K'$ mounted in bearings on the frame of the movable portion of the shield so that such shaft can partially rotate therein. By thus connecting the levers or handles K together by the shaft K' whenever the shaft is turned in its bearings both handles are correspondingly turned and consequently it is only necessary to grasp one of the handles K in order to operate the locking and releasing means on both sides of the vehicle. Either one of the handles K being operated causes both locking and releasing means to be simultaneously operated either to lock the telescopic sections together or to release them from the holding action of the locking means.

To change the position of the movable portion of the wind shield the driver or operator grasps the handle portion of either lever, as K, moving it toward its respective handle M thereby giving the nuts H a partial rotation sufficient to force the rods $h$ downward in the telescopic sections $e'$ moving the conical parts I relatively to the split portions $e^2$ of such sections, thereby releasing or unlocking the sections $e'$ from the sections $e$, then grasping the handle M, while still retaining the lever K in his grasp, the operator moves the movable portion of the shield into the position desired, holding it there and moving the lever K away from its handle M thereby rotating the nuts H in the opposite direction and again locking the respective sections together.

Instead of giving the nuts H, seen in preceding figures, rotative movement by the means there shown other means may be employed if desired as, for instance, sections of gears, as seen in Figs. 5, 6 and 7 of the drawings. In the embodiment shown in these Figs. 5 to 7, inclusive, each of the nuts H', which are to be partially rotated to move the rods $h$ endwise in the telescopic sections $e'$, for locking the two sections together and unlocking the same, is provided with a section or part of a gear N which meshes with a sectional gear N' mounted in a portion of the bracket $G^2$. Each sectional gear N' is provided with an arm $N^2$ by which it may be rotated in the bracket $G^2$ and cause its nut H' in its head piece $G^3$ fixedly attached to its telescopic section $e'$ to correspondingly rotate and move its rod $h$ in an endwise direction in the respective telescopic sections $e'$. Each arm $N^2$ of the sectional gears N' is at its free end connected with a pitman rod J' which in turn is pivotally connected with a lever K mounted on the shaft K' which is adapted to turn in bearings in the brackets L fixedly attached to the movable portion of the shield in the manner described in connection with the preceding figures of the drawings. By thus connecting the levers K with the arms $N^2$ of the sectional gears N', the sectional gears N formed on the nuts H' cause an endwise movement of both of the rods $h$ to lock and unlock the telescopic sections upon the movement of either of the handles K. The operation of locking and unlocking the telescopic sections is the same when the sectional gears are used, as shown in Figs. 5 to 7, as is the operation of the nuts H seen in Figs. 1 to 4, inclusive, of the drawings.

What is herein shown and described will naturally suggest to those skilled in the art other specific forms, constructions and arrangements of parts than what is herein seen which, while varying in form or detail, will be combined together in substantially the manner herein set forth for accomplishing essentially the same work as is accomplished by the combinations herein described and because of this I do not desire to limit myself to the specific forms, constructions and arrangements of parts herein set forth, but desire to include all forms, constructions and arrangements that are within the spirit or principle of my invention.

What I claim as new is:—

1. In a wind shield, the combination of a movable shield portion, holding or bracing means comprising two coacting relatively adjustable members pivoted respectively to the movable portion of the shield and to the body to which the shield is applied, locking means adapted to hold said members in any adjusted position, and operating means connected to the locking means and including coacting screw threaded power-transmitting members, an operating lever, said lever being removed from the screw threaded members, and means connecting the lever and one of said screw threaded members said means being pivotally connected to one of the screw threaded members, substantially as and for the purpose described.

2. In a wind shield, the combination of a movable portion, holding or bracing means including two coacting relatively adjustable members associated respectively with the movable shield portion and the body to which the shield is applied, locking means including a movable member operable upon its movement in one direction to lock the members of the bracing or holding means together, and operating means connected to the movable member of the locking means, the operating means including two coacting screw threaded power-transmitting parts, one of said parts being a nut, a handle lever, and means connecting the handle lever and the nut for giving rotatable movement to the nut, substantially as and for the purpose specified.

3. In a wind shield, the combination of a movable portion, holding or bracing means including two coacting relatively adjustable members, one of which is pivotally connected to the movable portion of the shield and the other of which is pivoted to the body to which the shield is applied, locking means adapted to lock the two members of the holding means in various fixed relations to one another, and operating means for the locking means, the operating means including screw threaded power-transmitting members, a handle lever, one of said threaded members being movable relatively to the other for operating the locking means, and means connecting the handle lever and the last-mentioned screw threaded member, said screw threaded member being arranged to move about an axis arranged at an angle to the axis of the pivotal connection between said movable shield portion and the member of the holding or bracing means pivotally connected to said movable portion, substantially as and for the purpose set forth.

4. In a wind shield, the combination of a movable portion, holding or bracing means including two coacting relatively adjustable members, one member being pivoted to said portion of the shield and the other being designed to be pivoted to the body to which the shield is applied, locking means adapted to hold said members in any adjusted position, and operating means connected to the locking means including screw threaded power-transmitting members located near the pivot connecting the holding means and the movable portion of the shield, a handle lever removed from such pivot, and means connecting the handle lever and one of the screw threaded members, substantially as and for the purpose described.

5. In a wind shield, the combination of a hinged shield portion, bracing means including two coacting relatively adjustable members, one member being pivoted to the hinged portion of the wind shield eccentric to the axis thereof, and the other member being pivotally connected to the body to which the shield is applied, locking means for holding said members in any adjusted position, and operating means connected to the locking means and including screw threaded power-transmitting members located near the pivot connecting the bracing means and said movable shield portion, a handle lever located near the hinge of the movable portion of the shield, and means connecting the handle lever and one of the screw threaded members, substantially as and for the purpose specified.

6. In a wind shield, the combination of a hinged shield portion, holding or bracing means arranged at opposite sides of the shield portion, each bracing means comprising two coacting relatively adjustable members, one member being pivoted to the movable portion of the shield eccentric to the axis thereof, and the other member being designed to be pivoted to the body to which the shield is applied, locking means for each of the bracing means including a movable part, and operating means for such part comprising screw threaded power-transmitting members, a handle lever at each side of the vehicle, means connecting each handle lever and one of the screw threaded members of the corresponding locking means, and means connecting the handle levers so that each handle lever when moved in one direction operates the movable screw threaded parts of both locking means, substantially as and for the purpose set forth.

RAPHAËL NETTER.

Witnesses:
 FRANK V. BRIESEN,
 WILLIAM R. SCHULZ.

---

Copies of this patent may be obtained for five cents each, by addressing the "Commissioner of Patents, Washington, D. C."